United States Patent [19]

Lin

[11] Patent Number: 4,756,893
[45] Date of Patent: Jul. 12, 1988

[54] UTILIZATION OF SULPHUR DIOXIDE FOR ENERGY PRODUCTION

[76] Inventor: Ping-Wha Lin, 506 S. Darling St., Angola, Ind. 46703

[21] Appl. No.: 926,661

[22] Filed: Nov. 4, 1986

[51] Int. Cl.$^4$ .......................... C01B 17/00; B01J 8/00
[52] U.S. Cl. ..................................... 423/244; 423/242
[58] Field of Search .......... 423/244 A, 242 R, 242 A, 423/244 R

[56] References Cited

U.S. PATENT DOCUMENTS

| | | | |
|---|---|---|---|
| 3,733,777 | 5/1973 | Huntington | 423/242 |
| 3,781,408 | 12/1973 | Lin | 423/244 |
| 3,855,125 | 12/1974 | Lin | 210/46 |
| 3,861,930 | 1/1975 | Lin | 106/109 |
| 4,054,463 | 10/1977 | Lin | 106/97 |
| 4,171,951 | 10/1979 | Lin | 432/77 |
| 4,229,411 | 10/1980 | Kisters et al. | 422/62 |
| 4,293,521 | 10/1981 | Isahaya et al. | 422/62 |
| 4,322,224 | 3/1982 | Roth | 55/20 |
| 4,387,078 | 6/1983 | Lin | 423/244 |
| 4,470,921 | 9/1984 | Lin | 252/189 |
| 4,482,096 | 11/1984 | Lin | 241/65 |

OTHER PUBLICATIONS

"SO$_x$ Removal and Acid Neutralization with Its By--Product", by Ping-Wha Lin, Environmental Science and Technology, vol. 12, p. 1081, Sep. 1978.
"Hydration Enhanced Sulfation of Limestone and Dolomite in the Fluidized-Bed Combustion of Coal", by S. A. Shearer et al, APCA Journal, vol. 30, No. 6, Jun. 1980.

Primary Examiner—Gregory A. Heller
Attorney, Agent, or Firm—Larry J. Palguta

[57] ABSTRACT

Gases containing high sulphur dioxide concentrations are used for energy production. The steps involve the conversion of sulphur dioxide to sulphur trioxide in a catalytic converter (40, 360, 570), the reaction of sulphur trioxide with lime and/or limestone in a fluidized reactor (60, 410, 580), and removal of heat from the chemical reactions for utilization in the production of superheated steam. The superheated steam that is produced can be used for the generation of electricity, for operating mechanical devices, space heating, lime production, construction materials curing, and heat exchange processes.

20 Claims, 3 Drawing Sheets

UTILIZATION OF SULPHUR DIOXIDE FOR ENERGY PRODUCTION

BACKGROUND OF THE INVENTION

The present invention relates to the utilization of high concentration sulphur dioxide gases for energy production, particularly for the production of superheated steam.

Sulphur dioxide released from fossil fuel combustion, metal smelting and other industrial activities is a worldwide air pollution problem. It is known that $SO_x$ can destroy agricultural products, damage man-made structures, imperil human health, and cause acid rain that kills aquarian life on a large scale. A growing body of evidence proves that sulphur dioxide is responsible for substantial adverse effects on public welfare and these effects can be accumulative.

In order to correct these damaging effects of $SO_x$, the control of sulphur oxides (sulphur dioxide and sulphur trioxide) at their sources is necessary. In the past, I have developed a sulphur dioxide removal and waste product utilization process and it is described briefly as follows: gas emissions from fuel-burning furnaces, metal smelters, ore roasters, or other industrial operations are treated to separate solid particles and to oxidize the sulphur dioxide ($SO_2$) contained therein into sulphur trioxide ($SO_3$). The $SO_3$ is reacted with lime (CaO) to form a calcium sulphate ($CaSO_4$) coating. The particles are then subjected to sudden quenching, resulting in the product of this process, "Linfan". Linfan is a solid product consisting of a core of lime surrounded by a shell of anhydrous calcium sulphate which has a plurality of cracks. Linfan can be used as a plastering material, for the reclamation of fly ash, and as a high-strength construction material. It can also be used advantageously as an efficient chemical for water and waste-water treatment.

The present invention is designed to expand the aforementioned process to include steam or energy production.

Chemical Reactions and Energy Production Potential of the Process:

First, $SO_2$ in gases is converted to sulfur trioxide in a catalytic converter according to the formula:

$$SO_2 + \tfrac{1}{2}O_2 \rightarrow SO_3; \Delta H = -23.5 \text{ K-cal/mole}$$

The gas rich in $SO_3$ is then reacted with lime to form a $CaSO_4$ coating on the lime particles:

$$SO_3 + CaO \rightarrow CaSO_4; \Delta H = -92.6 \text{ K-cal/mole}$$

In the presence of water vapor in the high temperature lime reactor, the following reactions also take place:

$$\begin{array}{l} SO_3 + H_2O \rightarrow H_2SO_4 \\ \underline{H_2SO_4 + CaO \rightarrow CaSO_4} \\ SO_3 + CaO \rightarrow CaSO_4 \end{array} \Delta H = -92.6 \text{ K-cal/mole}$$

The total heat generated from the process is 116.1 K-cal/mole which can be used for energy development.

The gas emissions high in sulphur dioxide concentrations can be used advantageously for energy production. Copper, zinc, nickel, lead smelting off-gases, gases from pyrites and other sulphite roasting, which normally have high $SO_2$ concentrations, are ideal for Linfan and steam production by my invention.

Liquid sulphur dioxide and elemental sulphur dioxide can also be used for energy production. When elemental sulphur is used, sulphur is oxidized to sulphur dioxide in a sulphur burner and additional heat is released by the following reaction:

$$S + O_2 \rightarrow SO_2; \Delta H = -70.9 \text{ K-cal/mole}$$

This heat can be used in the steam generation system.

SUMMARY OF THE INVENTION

The present invention comprises a process for effecting the continuous desulphurization of gases containing sulphur oxides and producing steam, comprising the steps of: transmitting gases having sulphur oxides to catalytic converter means in order to convert the sulphur dioxide therein to sulphur trioxide and resulting in a sulphur trioxide rich flue gas, transmitting the sulphur trioxide rich flue gas to a reactor and providing a calcium containing reactant to the reactor, withdrawing the reaction product of the reactant and sulphur oxides, transmitting a desulphurized exit gas from said reactor to first heat exchanging means in order to convert steam to superheated steam, communicating said exit gas to second heat exchanging means for further extraction of heat therefrom, and transmitting the desulphurized exit gas to an exit. Also included are the steps of communicating the sulphur trioxide rich flue gas to third heat exchanging means in order to convert steam to superheated steam and cool the sulphur trioxide flue gas, and returning the sulphur trioxide rich flue gas to the catalytic converter means in order to convert further the flue gas to sulphur trioxide rich flue gas

DETAILED DESCRIPTION OF THE INVENTION

Steam Production by Sulphur Dioxide in Metal Smelting or Ore Roasting Off-Gases

Off-gases from metal smelting normally contain high $SO_2$ concentrations. For exaple, in copper smelting the gas stream from the Inco process has an 80 percent sulphur dioxide concentration, the off-gases of the Outokumpu process contain 10-14 percent sulphur dioxide, and the off-gases from a Norand furnace have $SO_2$ concentrations in the range of 4-11 percent. These gases high in $SO_2$ concentrations can be used for steam (energy) production by my process.

Figure 1:
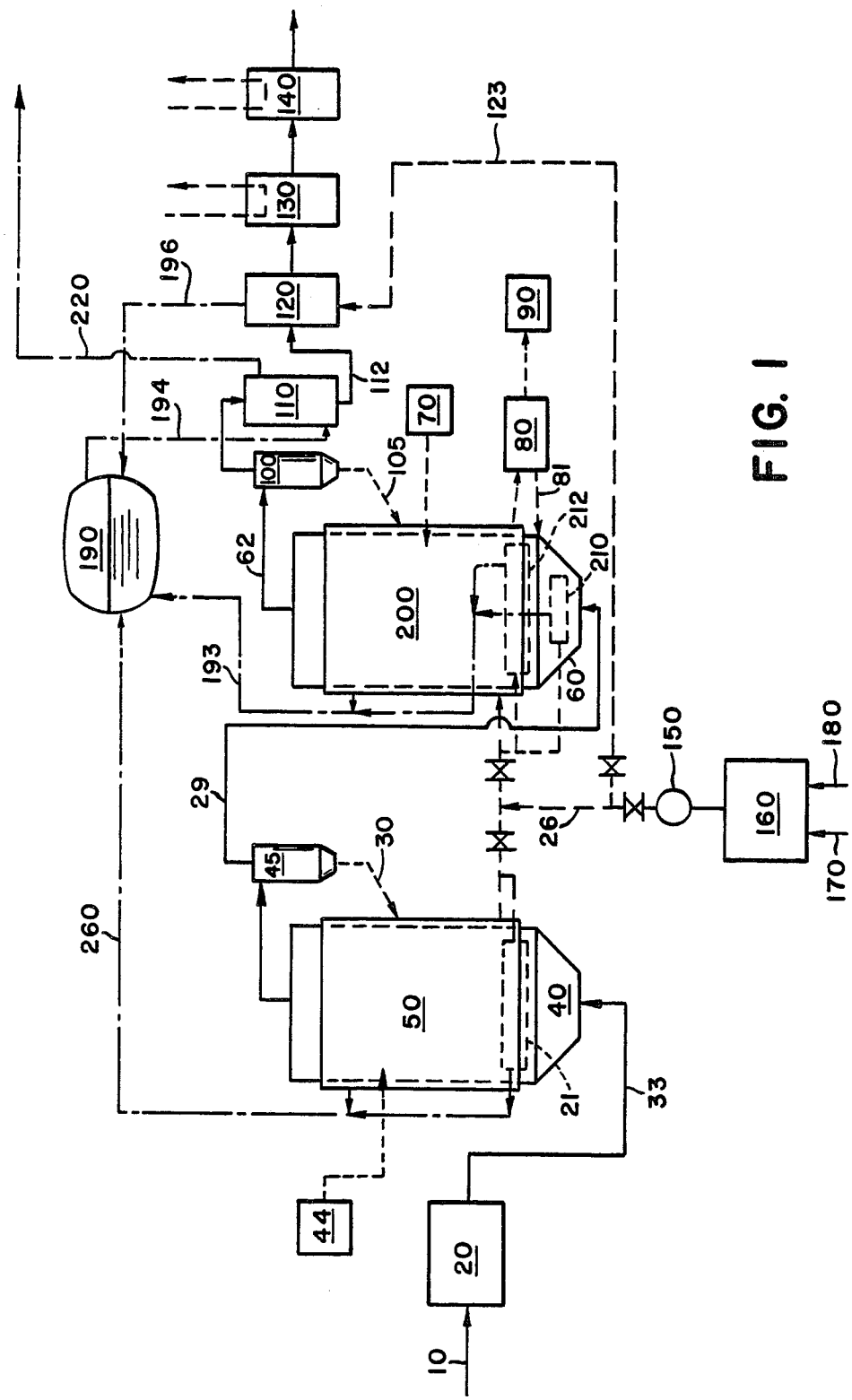
FIG. 1 illustrates a desulphurization process utilized for energy production wherein flue gas containing sulphur oxides is utilized.

Referring to FIG. 1, the sulphur oxide gases 10 rich in $SO_2$ concentration are from copper/zinc/nickel/lead smelting, pyrites and other sulphite roasting, and are used for energy production. The gases 10 pass first through a solids removal system 20 which can be an electro-static precipitator, a cyclone, or a combination of solids removal equipment. The gas cleansed of solids is then passed through line 33 to a catalytic converter 40.

The catalyst used for conversion of $SO_2$ to $SO_3$ can be selectively venadium compounds such as $V_2O_5$ (venadium pentoxide), plantinum, and iron oxide. Iron oxide can be used advantageously as an oxidizing catalyst for $SO_2$ gas from pyrites or other iron sulphite roasting because iron oxide is a major by-product of the operation and is plentiful.

The catalytic oxidation converter 40 can be a fixed-bed or fluid-bed converter. The fluid-bed converter operates under virtually isothermal conditions. It is thus possible to run the sulfur dioxide oxidation at a constant temperature in the optimum operating range of the catalyst. The heat released from the reaction is removed from the fluidized bed through indirect cooling by immersed tubes carrying water for steam generation. Furthermore, plugging by fly ash, as frequently occurs in a fixed bed converter, can be avoided or minimized. When a fluidized-bed is used, there is no need to preheat cold feed gases from metallurgical processes to the reaction temperature because the conditions in the fluidized-bed can be adjusted to provide the necessary heat to the incoming gas. The shortcoming of a fluid-bed converter is that the catalysts tend to break-up. Therefore, an extremely abrasion-resistant catalyst is required. In plants for pyrites or other iron sulphite roasting, iron oxide can be used advantageously as a catalyst in the fluidized bed, for iron oxide is plentiful in the plant, coupled with the fact that extremely high $SO_2$/$SO_3$ conversion efficiency is not required for my $SO_x$ removal and waste product utilization process. The loss of catalyst and low conversion efficiency of the iron oxide catalyst is not a problem for my process.

In FIG. 1, a fluidized catalytic oxidation converter 40 using iron oxide (from catalyst supply 44) as a catalyst is illustrated. The $SO_2$ in the gas is converted to $SO_3$ in the fluidized catalytic converter 40 according to the following equation:

$$SO_2 + \tfrac{1}{2}O_2 \rightarrow SO_3; \Delta H = -23.5 \text{ K-cal/mole}$$

The heat generated from the reaction is removed by the water in copper tubings in membrane wall 50 and immersed tubes in evaporator 21 for steam production. The temperatures of the catalytic converter 40 can be adjusted to the optimum temperature range for catalytic $SO_2$/$SO_3$ conversion by regulating the supply of water from water treatment package 160 to membrane wall 50 and evaporator 21 through line 26. The steam/water mixture from membrane wall 50 and evaporator 21 enters the steam drum 190 by line 260. The exit gas from fluidized catalytic converter 40 may carry some catalyst which is separated from the gas by cyclone 45 and returned to the converter by line 30.

The gas rich in sulphur trioxide is transmitted from cyclone 45 through line 29 to a fluidized reactor 60 in which nearly 100 percent of the $SO_x$ ($SO_2$ and $SO_3$) is removed from the gas by fluidized lime particles. Reactor 60 receives lime from lime supply unit 70. The desulphurization occurs according to the following:

$$SO_3 + CaO \rightarrow CaSO_4; \Delta = -92.6 \text{ K-cal/mole}$$

$$SO_2 + CaO \rightarrow CaSO_3$$

In the presence of oxygen, $CaSO_3$ is oxidized to $CaSO_4$:

$$CaSO_3 + \tfrac{1}{2}O_2 \rightarrow CaSO_4$$

The heat generated by the system can be summarized as follows:

| | |
|---|---|
| CATALYTIC OXIDATION CONVERSION | $\Delta H = -23.5$ K-cal/mole |
| $SO_3$ REACTION WITH LIME | $\Delta H = -92.6$ K-cal/mole |
| TOTAL HEAT GENERATED | $\Delta H = -116.1$ K-Cal/mole |

A total heat of 116.1 K-cal/mole is generated and it can be used in many energy development applications such as steam production.

Lime is continuously added to reactor 60 from lime supply unit 70 and the hot reacted lime particles having lime in a core coated with a $CaSO_4$ coating are continuously withdrawn to a quenching unit 80. The $CaSO_4$ coated lime particles are quenched rapidly in quenching unit 80, resulting in a plurality of thermal cracks in the $CaSO_4$ coating and the resulting product is called Linfan. Linfan may be transmitted to storage unit 90 or it can be resupplied via line 81 to the reactor 60 for further reaction therein with the sulphur trioxide rich flue gas. Linfan can be used for high strength construction materials, and as an efficient chemical for water and wastewater treatment, or resupplied to the reactor. Methods of supplying, resupplying and quenching are described in Lin U.S. Pat. No. 4,600,570 entitled "Continuous Controlled Process for Removing Sulphur Oxide Gases from Stack Gases" issued July 15, 1986, and incorporated herein by reference. It should be understood that calcium carbonate, or a mixture of lime and calcium carbonate, can be used as the reactant.

Because the chemical reaction between $SO_3$ and CaO is highly exothermic, in order to prevent the rapid rise of temperature within the reactor, the temperature of the reactor 60 is regulated by a membrane wall 200 and evaporators 210 and 212 to the range of 600° F. to 1500° F., preferably from 750° F. to 1000° F. The membrane wall encloses reactor 60 and has ¼ inch copper water/steam tubings. Water is continuously pumped through the copper tubings in the membrane wall and the evaporators 210 and 212 in the windbox and fluidized bed for removing heat from the gas in the reactor. The steam/water mixture from the membrane wall 200 and evaporators 210 and 212 flow through line 193 to steam drum 190 for water/steam separation.

The gas from lime reactor 60 flows continuously from the top of the reactor through line 62 to cyclone separator mechanism 100 for removal of attrited particles. The removed solid particles from cyclone 100 return to reactor 60 through line 105. The cleansed or desulphurized exit gas from cyclone 100 passes through superheater 110 to superheat the saturated steam received via line 194 from steam drum 190. The gas from superheater 110 is transmitted to economizer 120 via line 112, the heat in the gases being used to evaporate the feed water in economizer 120. The steam and water mixture from economizer 120 flows through line 196 to steam drum 190 for steam/water separation. Economizer 120 receives feed water via line 123 that is pumped by a feed water pump 150 connected with a water treatment package 160 which treats steam condensate 170 and make-up water 180.

The remaining heat in the desulphurized exit gas leaving economizer 120 can be extracted by a waste heat recovery unit 130 for heating and air conditioning and also utilized for a domestic hot water heater 140, etc.

The pressurized superheated steam created in superheater 110 is transmitted via line 220 for use in driving steam engines, steam turbines, compressors, for oil refining, heat exchanging processes, curing construction materials, indirect sorbent (lime) heating, and for lime production, etc.

Liquid Sulphur Dioxide for Energy Production

Recently several regenerative FGD (Flue Gas Desulphurization) processes for producing liquid sulphur dioxide have become available. The utilization of large amounts of liquid $SO_2$ should be properly planned so that the useful material will not become waste material which creates not only disposal problems but also imposes unnecessary financial burdens on industry.

Figure 2:
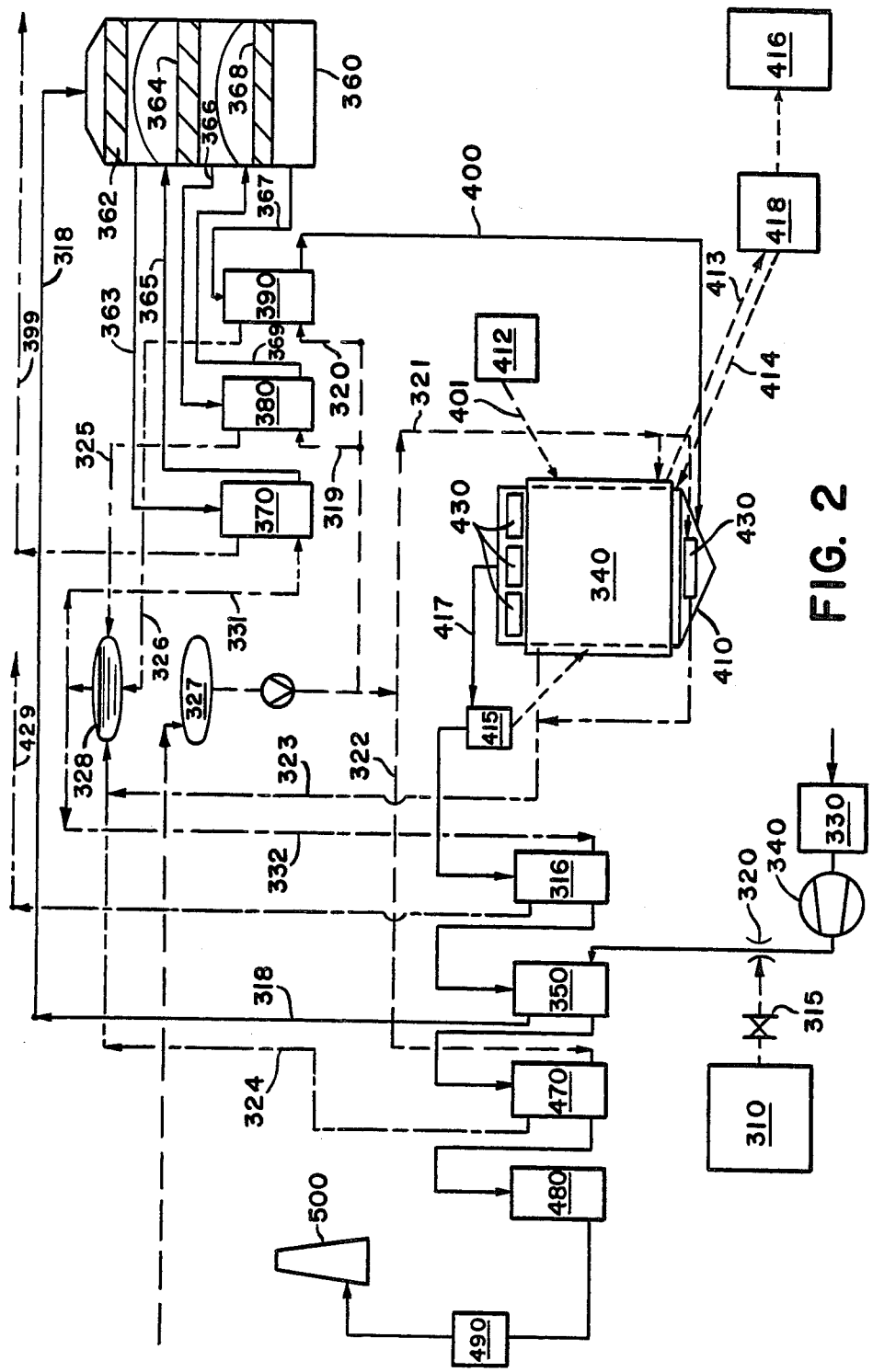
FIG. 2 illustrates a desulphurization process for energy production wherein liquid sulphur dioxide is utilized.

The utilization of overproduced liquid $SO_2$ for Linfan production (cracked calcium sulphate coated lime particles) and for energy production is an attractive alternative. FIG. 2 shows a flow diagram for steam production utilizing liquid sulfur dioxide.

Liquid sulphur dioxide in storage tank 310 is under pressure and released in gaseous form through an ejector 320 by opening valve 315. The $SO_2$ gas is diluted by air which passes through air filter 330 and moved by blower 340. The $SO_2$ concentration of the well-mixed gas is in the range of 2 percent to 16 percent, preferably from 4 to 10 percent. The well-mixed gas rich in $SO_2$ is then passed through an air preheater 350 which extracts heat from the gases received from steam superheater 316. The gas from air preheater 350 has a temperature of 800° F. to 900° F. and enters into a catalytic oxidation converter 360 via feed line 318. Converter 360 uses venadium pentoxide ($V_2O_5$) as a catalyst. Under the adiabatic conditions in the first bed 362 of converter 360, the heat generated in the reaction raises the temperature of the sulphur trioxide flue gas mixture until it reaches a value at which the reaction is essentially in equilibrium. As an example, for ten percent $SO_2$ by volume, the temperature is about 1100°–1160° F., which corresponds to a sulphur dioxide conversion of about 60 percent. Passing out of first bed 362 of converter 360 through line 363, the sulphur trioxide rich flue gases are cooled in steam superheater 370 to the second bed 364 inlet temperature of about 800° F. to 860° F. The gases from superheater 370 are transmitted via line 365 to second bed 364 and leave second bed 364 via line 366 to evaporator or boiler 380 for cooling to the third bed 368 inlet temperature of about 790° F. to 830° F. The sulphur trioxide rich flue gases leave evaporator or boiler 380 through line 369 to third bed 368 and then leave the third bed through line 367 to economizer 390. The sulphur trioxide rich flue gases leaving the third bed 368 are cooled to about 700° F. in economizer 390 and transmitted via line 400 to a fluidized lime reactor 410. The catalytic converter 360 can be a two-stage or a three-stage converter. In case a two-bed converter is used, over 85 percent conversion efficiency can be achieved for ten percent $SO_2$ by volume. When a three-bed converter is used, about 95 percent conversion can be obtained. In this illustration, the three-bed converter 360 is used.

The fluidized lime reactor 410 can be a single stage or a two-stage reactor. Lime is fed through line 401 from lime storage and feeding unit 412, and the reaction product, a lime material coated with $CaSO_4$, is continuously withdrawn from the reactor via line 413 to a quenching chamber 418 where the sudden cooling causes the fracture of the calcium sulphate coating of the particles. The resulting product is Linfan which is stored in Linfans storage 416 for future uses, or transmitted via resupply line 414 to reactor 410 for further reaction therein with the sulphur trioxide rich flue gases. Also, calcium carbonate may be used as a reactant, singularly or in combination with lime.

The reactor temperature is adjusted to a temperature in the range of 600° F. to 1500° F., preferably from 700° F. to 1000° F., by the cooling water and the copper tubings of membrane wall 340 and in evaporators 430. The desulphurized exit gas leaves lime reactor 410 through line 417 to cyclone mechanism 415 where the attrited particles are separated from the exit gas and returned to the reactor 410. The exit gas from cyclone 415 then passes through the steam superheater 316 for the generation of superheated steam, through preheater 350 for heating the well-mixed sulphur dioxide inlet gas, through economizer 470 for generation of water/steam mixture, and through waste heat recovery system 480 for heating and air conditioning, etc. The solids in the tail gas or exit gas from waste heat recovery unit 480 are further removed by a solids removal system 490 such as a filter (bag house) or electro-static precipitator before releasing to the stack 500.

The boiler feed water is fed from water drum 327 to various units through lines 319, 320, 321, and 322. The water/steam mixtures are sent from various units by lines 323, 324, 325, and 326 to steam drum 328. The saturated steam from steam drum 328 flows to steam superheaters 370 and 316 by lines 331 and 332, respectively.

The superheated steam is transmitted from steam superheaters 370 and 316 through lines 399 and 429, respectively, and can be used in many process applications and for operating mechanical devices. The superheated steam can also be used either for electricity generation or for the cogeneration.

Energy Production By Elemental Sulphur

Elemental sulphur is currently used mainly for sulphuric acid production. However, when the future desulphurization programs for acid rain control are implemented, the regenerated FGD systems may produce a large quantity of elemental sulphur. The production of sulphuric acid may reach a saturation level. Therefore, new ways and methods to utilize the large quantity of elemental sulphur produced must be explored and developed.

This invention is also designed for employing elemental sulphur as fuel for energy production such as for the generation of electricity and heating purposes.

Figure 3:
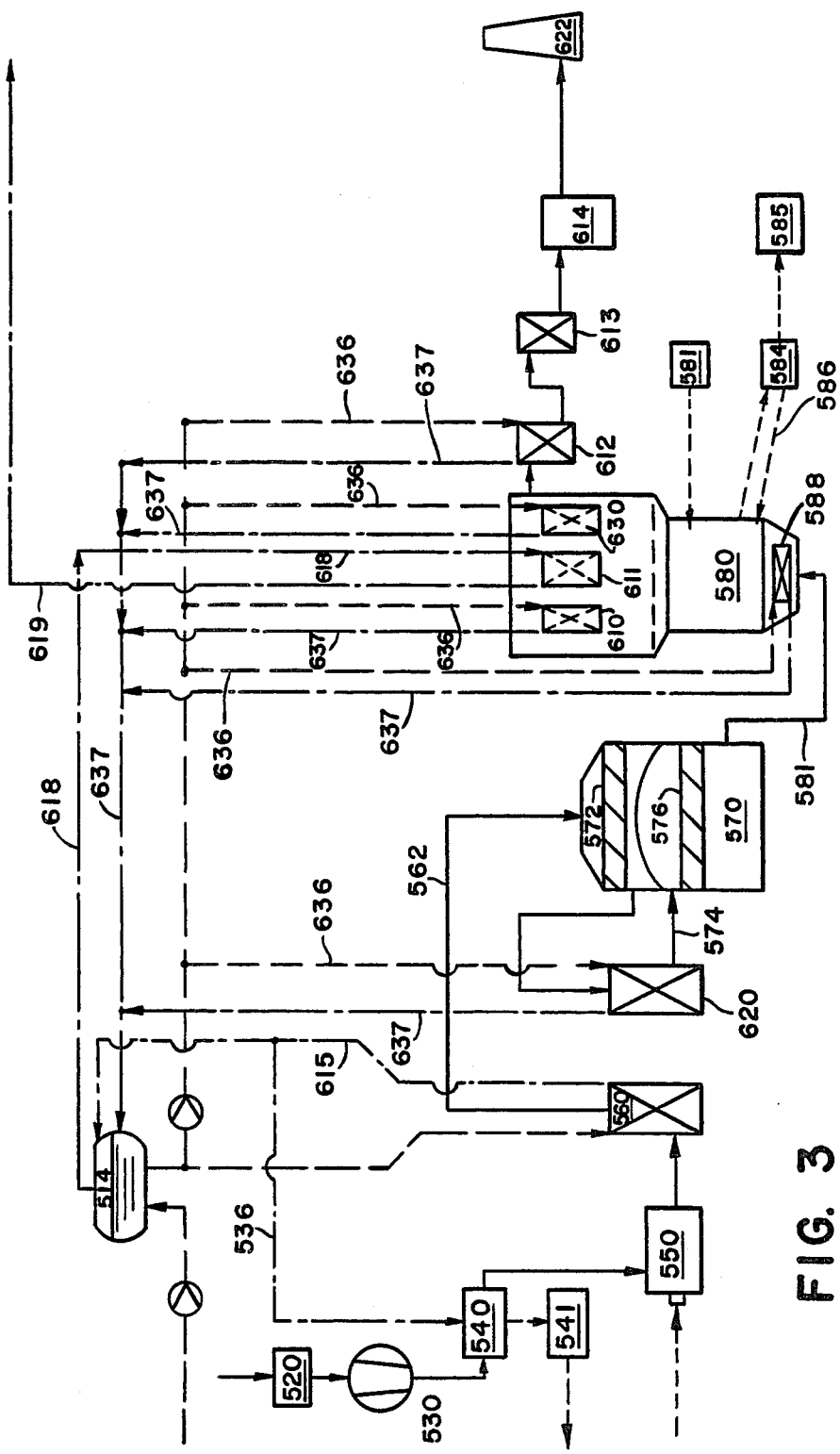
FIG. 3 illustrates a desulphurization process for energy production wherein elemental sulphur is utilized.

Referring to FIG. 3, air or atmosphere is first passed through a filter 520 by means of a blower 530. The cleansed air is then passed through an air preheater 540 and adjusted to a desired temperature by the steam, from a waste heat boiler 560, passing through lines 615 and 536. The heat in the cooled steam is utilized further by a waste heat recovery unit 541. The preheated air is used to supply the oxygen required for sulphur combustion in sulphur burner 550 according to the following formula:

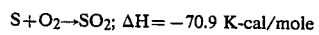

$$S + O_2 \rightarrow SO_2; \quad \Delta H = -70.9 \text{ K-cal/mole}$$

Sulphur, either in powder or liquid form, is added continuously to the sulphur burner and oxidized to sulphur dioxide, and the reaction is exothermic. The ignition temperature of sulphur is 470° F. and the heat generated from sulphur combustion is sufficient to sustain the combustion in the burner. Therefore, the combustion is autogeneous. When liquid sulphur is used, sulphur can be heated by steam (not shown) to about 350° F., at which temperature its viscosity is low enough to enable it to be sprayed through nozzles into the burner 550.

The sulphur used in sulphur furnace 550 can be from (1) recovered sulphur from sour natural gas, high sulphur fuel oils and stack gases rich in $SO_2$, (2) recovered sulphur from gas emissions from copper, zinc and other smelter operations, (3) recovered sulphur from gasification of coal, (4) recovered sulphur compounds from coal cleaning or washing processes, and (5) other sources.

The exit gas from sulphur burner 550 has a sulphur concentration in the range of 2 percent to 14 percent, preferably in the range of 4 percent to 10 percent. The temperature of the exit gas from the sulphur burner is reduced to 800°–900° F. by passing through a waste heat boiler 560 before being transmitted via line 562 to the catalytic converter 570. After catalytic converter 570, the gas is transmitted to reactor 580. In summary, the heat generated from the chemical reactions are:

$S + O_2 \rightarrow SO_2$ in sulfur combustion, $\Delta H = -70.9$ K-cal/mole $SO_2 + \frac{1}{2}O_2 \rightarrow SO_3$ in catalytic conversion, $\Delta H = -23.5$ K-cal/mole $SO_3 + CaO \rightarrow CaSO_4$ in lime reactor, $\Delta H = -92.6$ K-cal/mole The total heat generated from the chemical reactions of the system is 187 K-cal/mole which can be employed for steam generation, for the production of electricity, for opening mechanical devices, and for space heating. The exit gas from sulphur furnace or burner 550, having a $SO_2$ concentration of about 10 percent, is adjusted to a temperature of 800° F. to 900° F. by passing through the waste heat boiler 560. The gas rich in $SO_2$ from waste heat boiler 560 is then passed through line 562 to the catalytic oxidation converter 570 which utilizes venadium pentoxide ($V_2O_5$) or other suitable chemicals as a catalyst.

In this illustration, a two-bed converter 570 is used. As an example, for a gas having ten percent $SO_2$ by volume, about 85 percent of the $SO_2$ is converted into $SO_3$ by the two-bed converter 570. The gases from the first bed 572 of converter 570 are cooled to 850° F. by a economizer 620 where hot water received from steam drum 514 by line 636 is converted to steam/water mixture. The steam/water mixture enters steam drum 514 from economizer 620 through return line 637 for steam/water separation. The cooled gases return to converter 570 from economizer 620 via line 574, for further conversion by second bed 576. The gases rich in $SO_3$ from catalytic converter 570 then pass through line 581 to a fluidized lime reactor 580 in which nearly 100 percent of the $SO_2$ and $SO_3$ are removed from the gases. Reactant(s), selected from CaO, $CaCO_3$, or a combination of CaO and $CaCO_3$ of different proportions, are used to react with $SO_3$ in reactor 580.

Because the chemical reaction between $SO_3$ and CaO is highly exothermic, in order to prevent a rapid rise in temperature in the reactor, the temperature of the reactor is regulated by evaporators 588, 610 and 630, and superheater 611, to the range of 600° F. to 1500° F., preferably from 750° F. to 1000° F. Water flows from steam drum 514 through lines 636 to the copper tubings in evaporators 588, 610, 630 and economizer 612, and the water/steam mixture returns to steam drum 514 through return lines 637 for water/steam separation. The saturated steam flows from stream drum 514 through line 618 to superheater 611 where more heat in the gas is extracted by the saturated steam to become superheated steam. The superheated steam flows out of superheater 611 through line 619. The superheated steam can be used for the generation of electricity, lime production, oil refining, construction material curing, driving steam engines, compressors, space heating, heat exchanging process, etc. The heat in the exit gas from lime reactor 580 is further extracted in economizer 612 and waste heat recovery unit 613. The solids in the exit gas are removed by an electrostatic precipitator 614 before releasing to the atmosphere through a stack 622.

During operation, lime is continuously added to the reactor 580 from lime supply unit 581 and the hot reacted particles are continuously withdrawn to a quenching chamber 584. The $CaSO_4$ coated lime particles are quenched rapidly in quenching chamber 584, resulting in a plurality of thermal cracks in the $CaSO_4$ coating and the product "Linfan", which may be stored temporarily in Linfans storage 585 for future uses or recycled via line 586. Linfan has shown that it can be used for plastering materials, high strength construction material, and as an efficient chemical for water and waste water treatment, etc.

The use of $SO_2$ for energy production has not been attempted before and is new. The energy production involves the conversion from $SO_2$ to $SO_3$ and the reaction of $SO_3$ with lime and/or calcium carbonate.

Since the temperature of the energy production system is adjusted to not over 1500° F., $NO_x$, (NO and $NO_2$) can not be formed in the gas. Therefore, the system has no nitrogen oxides ($NO_x$) pollution problem.

In view of the high reactivity of $SO_3$ with lime particles, 100 percent $SO_3$ removal from the gas can be achieved easily. In the presence of high concentration $SO_3$, $SO_2$ is also very reactive with lime. One hundred percent, or nearly 100 percent $SO_x$ ($SO_2$ and $SO_3$) removal efficiency has been repeatedly demonstrated in different reactor environments (combinations of different $SO_x$ concentrations and gas temperatures). Therefore, the system is environmentally acceptable. In short, the system not only removes $SO_2$ from gas and produces a useful product such as Linfan, but it also replaces conventional fuels for the generation of energy for steam production. Consequently, the system is not only self-sustained in power supply, but economically self-supported and environmentally acceptable. Thus, I have solved a problem of air pollution and satisfied a long-standing need for a commercially acceptable system for air pollutants disposal.

Although the present invention has been illustrated and described in connection with a few selected example embodiments, it will be understood that they are illustrative of the invention and are by no means restrictive thereof. It is reasonable to expect that those skilled in the art can make numerous revisions and adaptations of the invention and it is intended that such revisions and adaptations will be included within the scope of the following claims as equivalents of the invention.

What is claimed is:

1. A process for effecting the continuous desulphurization of gases containing sulphur oxides and producing steam, comprising the steps of:

transmitting gases having sulphur oxides to catalytic converter means in order to convert the sulphur dioxide therein to sulphur trioxide and resulting in a sulphur trioxide rich flue gas, the converter means including a membrane wall for transmitting a medium therethrough and recovering heat from the converter means, and evaporator means for controlling the temperature in the converter means, communicating the sulphur trioxide rich flue gas to first heat exchanging means in order to convert steam to super-heated steam and cool the sulphur trioxide rich flue gas, returning a sulphur trioxide rich flue gas to the catalytic converter means in order to convert further the flue gas to sulphur trioxide rich flue gas, transmitting the sulphur trioxide rich flue gas to a fluidized bed reactor and providing a calcium containing reactant to the reactor, the reactor including a membrane wall for transmitting a medium therethrough and for recovering heat from a reaction effected by said reactant and sulphur oxides, and at least one evaporator mechanism for the recovery of heat from the reaction between the reactant and sulphur oxides, transmitting a heated medium from said reactor to steam drum means for providing saturated steam to second heat exchanging means, withdrawing the reaction product of the reactant and sulphur oxides, transmitting a desulphurized exit gas of said reactor through said second heat exchanging means, in a nonrecirculating manner, in order to convert water to steam, communicating said exit gas to third heat exchanging means for further extraction of heat therefrom, and transmitting said desulphurized exit gas to an exit.

2. A process for effecting the continuous desulphurization of gases containing sulphur oxides and producing steam, comprising the steps of:

transmitting gases having sulphur oxides to catalytic converter means in order to convert the sulphur dioxide therein to sulphur trioxide and resulting in a sulphur trioxide rich flue gas, the converter means including a membrane wall for transmitting a medium therethrough and recovering heat from the converter means, and evaporator means for controlling the temperature in the converter means, transmitting the sulphur trioxide rich flue gas to a fluidized bed reactor and providing a calcium containing reactant to the reactor, the reactor including a membrane wall for transmitting a medium therethrough and for recovering heat from a reaction effected by said reactant and sulphur oxides, and at least one evaporator mechanism for the recovery of heat from the reaction between the reactant and sulphur oxides, transmitting a heated medium from said reactor to steam drum means for providing saturated steam to first heat exchanging means, withdrawing the reaction product of the reactant and sulphur oxides, transmitting a desulphurized exit gas of said reactor through said first heat exchanging means, in a non-recirculating manner, in order to convert water to steam, communicating said exit gas to second heat exchanging means for further extraction of heat therefrom, and transmitting said desulphurized exit gas to an exit.

3. The process in accordance with claim 2 further comprising the steps of:

communicating the sulphur trioxide rich flue gas to third heat exchanging means in order to convert steam to super-heated steam and cool the sulphur trioxide rich flue gas, returning the sulphur trioxide rich flue gas to the catalytic converter means in order to convert further the flue gas to sulphur trioxide rich flue gas.

4. The process in accordance with claim 2, further comprising the step of transmitting said sulphur trioxide rich flue gas from said catalytic converter means through an economizer in order to recover heat therefrom prior to the sulphur trioxide rich flue gas entering the reactor.

5. The process in accordance with claim 2, wherein the converter means is a fluid bed catalytic converter.

6. The process in accordance with claim 2, wherein the reactant comprises one of calcium oxide and calcium carbonate.

7. The process in accordance with claim 2, wherein the reactant comprises a combination of calcium oxide and calcium carbonate.

8. The process in accordance with claim 2, wherein the second heat exchanging means comprises an economizer and a mechanism for recovering heat from the desulphurized exit gas leaving the first heat exchanging means.

9. The process in accordance with claim 2, further comprising the step of supplying liquid sulphur dioxide by ejector and blower means in order to produce the sulphur oxide gases.

10. The process in accordance with claim 2, further comprising the step of preheating said sulphur oxides gases prior to transmission to said catalytic converter means.

11. The process in accordance with claim 2, further comprising the step of quenching the reaction product to effect a porous core region of unreacted reactant in an outer shell of cracked calcium sulphate.

12. The process in accordance with claim 2, further comprising the step of resupplying the quenched reaction product to the reactor for additional reaction with sulphur oxides within the core region of the reaction product.

13. The process in accordance with claim 2, further comprising the steps of supplying air and sulphur to furnace means for heating thereof in order to produce the sulphur oxides gases supplied to said converter means.

14. The process in accordance with claim 13, further comprising the step of communicating the sulphur oxides gases from said furnace means to a heat exchanger for extracting heat therefrom prior to transmitting the gases to said catalytic converter means.

15. The process in accordance with claim 2, wherein the first heat exchanging means receives said water in the form of steam and converts the steam to super-heated steam.

16. The process in accordance with claim 15, wherein the second heat exchanging means comprises an economizer and a mechanism for recovering heat from the desulphurized exit gas leaving the first heat exchanging means.

17. The process in accordance with claim 15, further comprising the step of supplying liquid sulphur dioxide by ejector and blower means in order to produce the sulphur oxide gases.

18. The process in accordance with claim 15, further comprising the step of preheating said sulphur oxides gases prior to transmission to said catalytic converter means.

19. The process in accordance with claim 15, further comprising the steps of supplying air and sulphur to furnace means for heating thereof in order to produce the sulphur oxides gases supplied to said converter means.

20. The process in accordance with claim 19, further comprising the step of communicating the sulphur oxides gases from said furnace means to a heat exchanger for extracting heat therefrom prior to transmitting the gases to said catalytic converter means.

* * * * *